United States Patent [19]

Burns

[11] 4,239,242
[45] Dec. 16, 1980

[54] PIPE UNION AND SEAL

[76] Inventor: William G. Burns, 23 Barberry La., St. Louis, Mo. 63122

[21] Appl. No.: 970,541

[22] Filed: Dec. 18, 1978

[51] Int. Cl.³ .................. F16J 15/12; F16J 15/32
[52] U.S. Cl. .................... 277/153; 277/165; 277/166; 277/198; 277/206 R; 285/111; 285/349; 285/379
[58] Field of Search ............... 277/125, 142, 152, 153, 277/164, 165, 166, 188 R, 198, 205, 206 R; 285/111, 349, 379

[56] References Cited

U.S. PATENT DOCUMENTS

| 1,071,235 | 8/1913 | Hutton | 285/349 X |
|---|---|---|---|
| 1,490,716 | 4/1924 | Schwennker | 285/111 X |
| 1,683,076 | 9/1928 | Johnson et al. | 277/206 X |
| 2,374,138 | 4/1945 | Sanford | 285/379 X |
| 2,538,683 | 1/1951 | Guiler et al. | 277/153 X |
| 2,898,167 | 8/1959 | Tanner | 277/152 |
| 3,114,561 | 12/1963 | Creath et al. | 277/152 |
| 3,223,426 | 12/1965 | Reid | 277/153 |
| 3,285,632 | 11/1966 | Dunkle | 277/206 X |
| 3,419,280 | 12/1968 | Wheeler | 277/125 X |
| 3,512,789 | 5/1970 | Tanner | 277/153 X |
| 3,680,874 | 8/1972 | Schwarz | 277/153 |
| 3,687,465 | 8/1972 | Grime et al. | 277/188 R |
| 3,820,799 | 6/1974 | Abbes et al. | 277/164 |
| 4,114,907 | 9/1978 | Abbes et al. | 277/206 R |

FOREIGN PATENT DOCUMENTS

| 735801 | 8/1955 | United Kingdom | 277/153 |
| 758447 | 10/1956 | United Kingdom | 277/152 |
| 1441207 | 6/1976 | United Kingdom | 285/349 |

Primary Examiner—Robert S. Ward, Jr.
Attorney, Agent, or Firm—Rogers, Eilers & Howell

[57] ABSTRACT

A pipe union and compound seal has a first pipe member with a central passageway, a sealing surface and a flange with a shoulder. The union has a fastening member adapted to slide around the first pipe member. The fastening member has a matching flange to abut the first pipe member's flange and has threads formed along the inner surface of the fastening member. A second pipe member has a matching central passageway and threads formed along its outer surface to receive and engage the fastening member's threads. The second member has a face opposing the first pipe member's sealing surface with a trough in the face for receiving and retaining the compound seal. The compound seal is positioned in the trough and in a first embodiment has a central spring and a U-shaped outer shell surrounding the spring. The open end of the shell is disposed radially inward so that increased pressure within the central passageways increases the sealing engagement between the shell and the pipe union. In a second embodiment, the compound seal is a metallic C-ring made of a relatively hard metal with a coating of softer metal on its outer surface. The second embodiment is suitable for applications involving extremely low or high temperature conditions.

5 Claims, 4 Drawing Figures

PIPE UNION AND SEAL

BACKGROUND AND SUMMARY

Pipe unions and couplings are used to join together two sections of pipe and usually require a machined metal to metal or a resilient seal to prevent leakage and loss of fluid at the coupling. In the prior art, O-rings or gaskets fashioned out of neoprene, or other flexible plastics or rubber, are almost exclusively used to seal these couplings. These gaskets or seals are sometimes held in position on one of the two sealing members by the use of a groove or slot. Other gasketed unions use only the pressure of the two sealing members to hold the seal in place. The union is joined together with the second member and the seal compressed between the trough and the opposite face of the second member with threads or other structure used to tighten the coupling and compress the seal. An example of a typical prior art device is disclosed in Callahan U.S. Pat. No. 3,288,494.

Problems have been experienced with the prior art devices in that the O-ring seal or gasket is dependent upon the pressure created in the mechanical tightening of the coupling to ensure a good seal. This tight mechanical connection compresses the O-ring or gasket and distorts it around the small base existing between the machined surfaces at which the seal takes place. In the gasketed union there is a common tendency for the gasket material to either cold flow, migrate or take a compressive set causing leakage. The metal-to-metal union is largely dependent on a meshing of two highly polished or ground surfaces to effect a seal. Any small scratches or knicks on the sealing surface will interfere with the proper meshing of the two surfaces and cause leakage. These surface imperfections are common due to handling during assembly and are often incurred during disassembly. It is usually the practice that the two sealing surfaces in the metal-to-metal union are ground to match each other. This does not allow the replacement of just one side of the union.

These problems are particularly troublesome in applications subjecting the pipe union to the extremes of temperature and moisture, such as in a steam line. The added stress caused by these extremes results in a substantially reduced seal life and the increased expense of seal replacement much earlier than should be required.

Applicant has succeeded in inventing a pipe union and seal combination which overcomes the problems existing in the prior art and which increases both the operating life and the operating temperature ranges of the pipe coupling and seal. The first embodiment of applicant's invention generally includes the use of a compound seal having a flexible U-shaped shell with a central spring disposed within the arms of the "U". Seals such as are manufactured and sold under the trade name "Omniseal" are suitable for use in applicant's invention. The U-shaped shell may be constructed of any type of suitable plastic including polytetrafluoroethylene, TEFLON TM, or other similar plastics. The central spring may be a helical wound flat wire spring and is disposed within the arms of the U-shaped shell to provide it shape, add to its natural resiliency, and compensate for the cold flow properties of the shell material. This compound seal is much more resistant to the extremes of temperature and pressure than was available with the gasketed, O-ring or metal-to-metal unions in the prior art, and dramatically increases the ability to reliably reuse or remake the union without leakage.

Applicant's compound seal is tightened not only through the mechanical pressure created in the coupling itself but also by the pressure of the fluid flowing through the pipe union. Furthermore, as the outer shell is preferably constructed of plastic or other soft materials, scratches or other damage to the sealing surfaces of both the metal glands or the seal itself are compensated for because upon installation, the spring-imposed load causes the shell material to cold flow or migrate into discontinuities in the sealing surface. Cold flow, often considered a disadvantage of TFE type plastics, is utilized to provide conformance with the sealing surface, ensuring positive sealing. Cold flow stops when a point of equilibrium is reached between the load of the spring and the compressive yield of the TFE. Ample squeeze remains to provide long-term sealing.

A second embodiment of applicant's invention includes a metal C-ring having its opening facing the center of the union and sized to have a cross-sectional width greater than the trough within which it is inserted. A sealing surface of each part of the union is brought into engagement with the C-ring and compresses the C-ring as it is assembled. Generally, the C-ring is made of a hardened metal such as stainless steel with a coating of a somewhat softer metal such as silver. Thus, a sealing surface is formed between the stainless steel of the C-ring and the union with a buffer of a softer metal such as silver. Although this softer surface on the metal C-ring is susceptable to scratching, the metal C-ring is capable of operating at temperatures ranging from cryogenic to 1200° F. Thus, applicant's invention is suitable for use in applications requiring the piping of cryogenic to superheated fluids under temperatures which would destroy conventional seals. Those applications which would not require a constant opening and closing of the pipe union but instead could be fixed permanently in place until a failure occurred would be particularly suited for use with this embodiment of applicant's invention.

These and other advantages of applicant's invention may be more fully understood by referring to the drawings and detailed description of the preferred embodiment.

DETAILED DESCRIPTION OF THE PREFERRED EMBODIMENT

Figure 1:
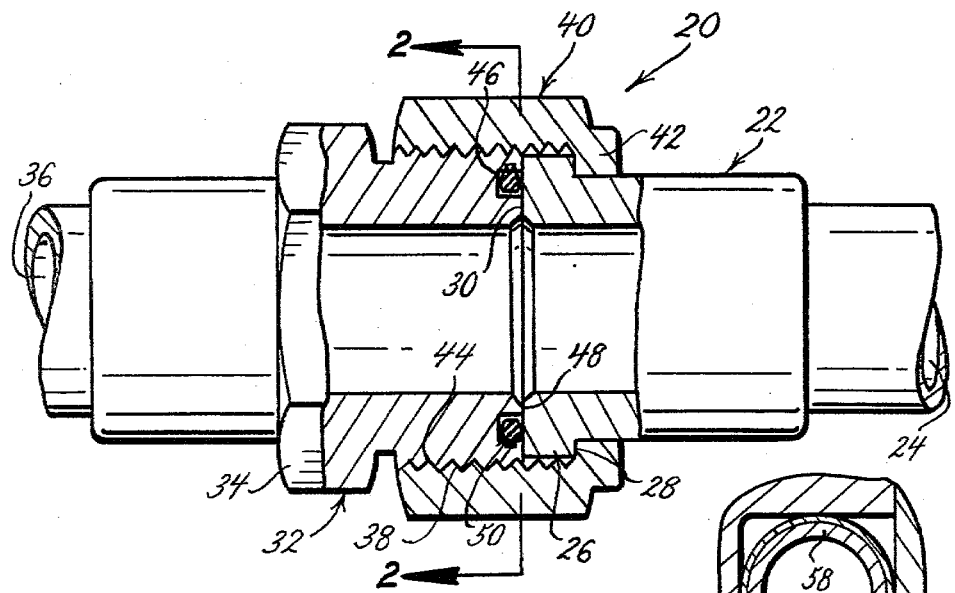
FIG. 1 is a partial cross-section of a pipe coupling and compound seal combination of the present invention.

Referring to FIG. 1, a pipe union 20 is shown having a first pipe member 22 of generally annular shape with a central passageway 24 therethrough. A flange 26 is formed at the connector end of the first member, said flange having a shoulder 28 and a sealing surface 30 along the face of the flange 26. A second pipe member 32 has a hexagonal head 34 and is generally annular with a central passageway 36 therethrough. Threads 38 are formed along the outer periphery of the second pipe member 32. A fastening member 40 has an inwardly extending flange 42 which engages flange 26 of first pipe member 22 and provides structure to lock down the pipe union 20. Threads 44 are formed along the inner periphery of fastening member 40 and match and line up with threads 38 formed in the outer periphery of second pipe member 32. Said first and second pipe members 22, 32, and fastening member 40 are formed to match and line up central passageways 24 and 36 to create continuous passage for the flow of fluid through the pipe union. A trough 46 is formed in the face 48 of a second pipe member 32 and has a generally annular shape surrounding central passageway 36.

Figure 3:
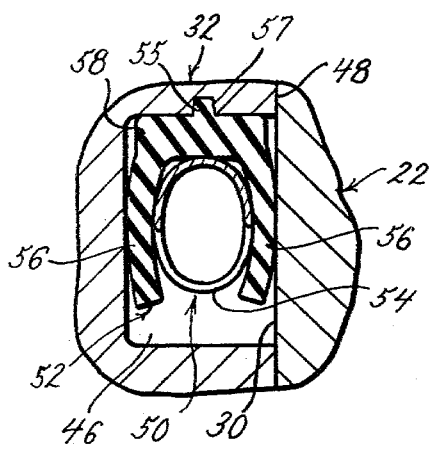
FIG. 3 is an enlarged cross-sectional view of the seal in contact with the sealing surfaces of the pipe coupling.
Figure 2:
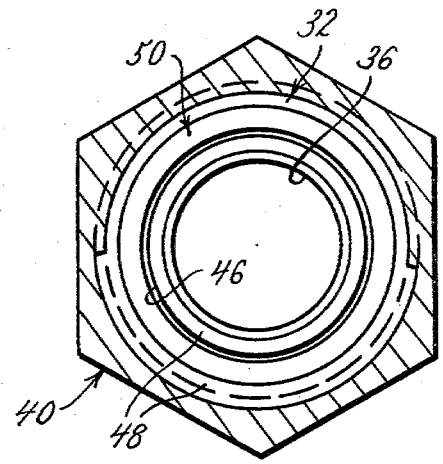
FIG. 2 is a cross-section taken along the plane of line 2—2 in FIG. 1 detailing the seal in position.

A compound seal 50 fits within said trough 46 and provides a seal between pipe members 22, 32 to prevent the leaking of fluid along sealing surface 30 and into the threaded connection formed between fastening member 40 and first and second pipe members 22, 32. In the first embodiment shown in FIGS. 2 and 3, compound seal 50 includes a generally U-shaped outer shell 52 with a spring 54 disposed between the legs 56 thereof. The outer shell 52 has a flattened base 58 which supports the legs 56 and resists compression of the legs 56 and enhances the tendency of fluid pressure in the central passageway 24, 36 to exert an outward force on legs 56 and thereby increase the effective seal. Shell 52 may be formed out of polytetrafluoroethylene which will withstand the extremes of temperature and moisture and also exhibits a tendency to flow into discontinuities of the sealing surface 30 and trough 46. Compound seal 50 may be held in position by a ridge 55 formed in base 58 which is received in a groove 57 formed in member 32.

A seal is also created by compression of legs 56 between the first and second pipe members 22, 32 as the at rest width of seal 50 is greater than the depth of trough 46. Spring 54, contained between legs 56, acts to resist compression and thereby exerts an outward force tending to cause a seal between legs 56, sealing surface 30 and the bottom of the trough 46. Thus, a seal is formed through both the mechanical coupling force of the pipe union 20 and also through the pressure of the fluid flowing therethrough. This compound action ensures a positive seal and eliminates the need to over-tighten the pipe union to gain a tight seal at the connection.

Figure 4:
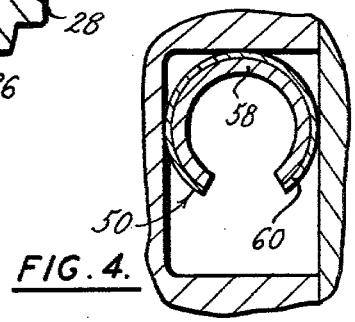
FIG. 4 is an enlarged cross-sectional view of a second embodiment where a metallic C-ring is used as the sealing means.

In applicant's second embodiment shown in FIG. 4, compound seal 50 includes a generally semi-circular shaped metal C-ring 58 which has a coating 60 applied around its outer diameter. Coating 60 is usually a softer metal than the C-ring 58 to aid in forming a seal between the C-ring 58 and sealing surface 30 and trough 46. As with the compound seal of the first embodiment, a seal is formed through both the mechanical coupling force of the pipe union 20 and also through the pressure of the fluid flowing therethrough.

OPERATION

The pipe union 20 may be assembled by first aligning the opposing faces of the pipe members 22, 32, including passageways 24, 36. The fastening member 40 should be withdrawn from the connection at this time. After alignment of the two pipe members, fastening member 40 may be slid along the pipe and then along the first pipe member 22 until its threads 44 contact the opposing threads 38 of the second pipe member 32. The fastening member 40 is then rotated in a clockwise direction which advances it onto the annular portion of second pipe member 32 until the sealing surface 30 of first pipe member 22 is drawn into contact with the outer leg 56 of compound seal 50. This occurs as the flange 42 of fastening member 40 contacts the shoulder 28 of first pipe member 22 and draws it closer to second pipe member 32. As fastening member 40 continues to advance, it reaches the extent of its travel and a compressive force is exerted on compound seal 50 and causes both legs 56 to contact their respective sealing surfaces. These are sealing surface 30 and the bottom of trough 46. After fastening member 40 has been fully tightened, fluid may pass through the central passageways 24, 36 and some of the fluid seeps into the juncture between first pipe member and second pipe member 32. This fluid contacts the seal 50 and exerts a force against legs 56 tending to separate them which increases the effective seal. The base 58 resists the pressure of the fluid and forces the legs 56 to absorb the extra pressure of the fluid against their respective sealing surfaces. Assembly and operation of the second embodiment of applicant's invention is substantially similar to his first embodiment.

The U-shaped shell 52 is generally made of polytetrafluoroethylene and can thus withstand substantially greater operating temperatures than the materials commonly used to construct O-rings, such as neoprene, rubber, or other elastomers. Applicant's first embodiment is particularly suited for use in a steam line having temperatures approaching 500° F. or 260° C. Applicant's second embodiment is suitable for use in temperatures ranging from cryogenic to 1200° F. In a standard O-ring, the O-ring is deformed into an abnormal shape tightly against the surfaces of the trough and sealing surface, which, over a period of time, reduces its effectiveness and increases its susceptibility to cracking and wearing. Another feature or benefit of the TFE or metal C-ring is shelf life. All elastomeric O-rings have a limited life. Even at room temperature an elastomeric O-ring such as Viton, Buna, Silicone, Neoprene, etc. will remain useful for four to seven years. A C-ring made of TFE or metal can be stored indefinitely. In addition, as the normal shape of an O-ring is circular in cross section, it is not as effective in utilizing the pressure of the fluid in increasing the sealing force between it and the sealing surfaces of the pipe union.

Various changes and modifications to applicant's invention may be obvious to one of ordinary skill in the art and are included in the teachings of applicant's invention. Applicant intends that his invention be limited only by the scope of the claims appended hereto.

What is claimed is:

1. A pipe union and seal in combination comprising:
   (a) A first pipe member having a central passageway therethrough, a flange having a substantially flat sealing surface, said flange having a shoulder,
   (b) A fastening member having an inwardly extending flange with a central passageway adapted to fit around said first pipe member, said inwardly extending flange adapted to abut said shoulder as said fastening member is fitted over said first pipe member, and thread means formed on the inner surface of said fastening means,
   (c) A second pipe member having a central passageway therethrough, thread means formed on the outer surface of said second pipe member and adapted to receive and engage the thread means of the fastening member, said second pipe member having a face opposing the sealing surface of said first pipe member, means defining a trough in said face for receiving and retaining a sealing means, and (d) A compound sealing means positioned in said trough, said seal having a central spring and a U-shaped outer shell surrounding said spring with the open end of said shell being disposed radially inwardly so that increased pressure within the central passageway increases the sealing engagement between each leg of the shell and its corresponding surface.

2. The device of claim 1 wherein the central spring is a helical wound flat wire support spring and the U-shaped shell is made of polytetrafluoroethylene, said shell having means to migrate into discontinuities of the sealing surface and thereby improve the seal between the shell and the sealing surface.

3. The device of claim 1 wherein said pipe union is used in a steam line and the sealing means is adapted to withstand operating temperatures of approximately 500° F. or 260° C.

4. The device of claim 1 wherein the compound seal has a cross-sectional width greater than the depth of the trough so that tightening of the fastening member onto said first pipe member brings the sealing surface into contact with said compound seal to thereby form a fluid tight seal.

5. The device of claim 4 wherein the compound seal includes a flattened base which contacts the sidewall of said trough opposite said central passageway, said flattened base supporting each of said legs therefrom to resist compression of said legs as fluid flows through the central passageway, said base having a ridge formed thereon, and said second member having means defining a groove to receive and retain said ridge to thereby hold said ridge.

* * * * *